United States Patent
Randall et al.

(10) Patent No.: US 9,848,338 B2
(45) Date of Patent: Dec. 19, 2017

(54) SMALL CELL PLANNING

(71) Applicant: Viavi Solutions UK Limited, Berkshire (GB)

(72) Inventors: Peter Randall, Abingdon (GB); Howard John Thomas, Stonehouse (GB); Walter Featherstone, Berkshire (GB); Krassimir Stoyanov Vassilev, Berkshire (GB); Sthiven Pinilla, Berkshire (GB); Mohsen Zadeh-Koochak, Abingdon (GB)

(73) Assignee: Viavi Solutions UK Limited, Berkshire (GB)

( * ) Notice: Subject to any disclaimer, the term of this patent is extended or adjusted under 35 U.S.C. 154(b) by 0 days.

(21) Appl. No.: 15/225,219

(22) Filed: Aug. 1, 2016

(65) Prior Publication Data

US 2017/0041806 A1    Feb. 9, 2017

Related U.S. Application Data

(60) Provisional application No. 62/201,466, filed on Aug. 5, 2015.

(51) Int. Cl.
*H04W 40/00*    (2009.01)
*H04W 16/18*    (2009.01)
(Continued)

(52) U.S. Cl.
CPC .......... *H04W 16/18* (2013.01); *H04W 16/22* (2013.01); *H04W 16/32* (2013.01); *H04W 84/045* (2013.01)

(58) Field of Classification Search
CPC ..... H04W 16/18; H04W 16/22; H04W 24/02; H04W 84/045; H04W 16/32
See application file for complete search history.

(56) References Cited

U.S. PATENT DOCUMENTS 8,374,596 B2    2/2013  Thiel et al.
9,609,526 B2 *  3/2017  Bader ................ H04W 16/24
(Continued)

FOREIGN PATENT DOCUMENTS

EP    2 506 623 A2    10/2012
EP    2506628          10/2012
(Continued)

OTHER PUBLICATIONS

Extended European Search report corresponding to EP 16183069, dated Dec. 16, 2016, 9 pages.
(Continued)

*Primary Examiner* — Ajit Patel
(74) *Attorney, Agent, or Firm* — Harrity & Harrity, LLP (57) ABSTRACT

A device may include one or more processors configured to receive information associated with one or more performance goals to be achieved within a radio access network (RAN). The device may receive performance information for mobile devices associated with the RAN. The device may determine that at least one performance goal, of the one or more performance goals, is not being achieved within the RAN. The determining may be based on the information associated with the one or more performance goals and the performance information. The device may generate a small cell plan for improving performance within the RAN toward achievement of the at least one performance goal. The small cell plan may identify a set of locations at which a set of small cells are to be activated, deactivated, or deployed. The device may output information associated with the small cell plan.

20 Claims, 5 Drawing Sheets

(51) Int. Cl.
*H04W 16/22* (2009.01)
*H04W 16/32* (2009.01)
*H04W 84/04* (2009.01)

(56) References Cited

U.S. PATENT DOCUMENTS

| | | | |
|---|---|---|---|
| 2009/0047956 A1* | 2/2009 | Moe | H04J 11/0093 |
| | | | 455/436 |
| 2011/0249558 A1* | 10/2011 | Raaf | H04B 7/2606 |
| | | | 370/237 |
| 2011/0294499 A1 | 12/2011 | Vikberg et al. | |
| 2011/0319093 A1 | 12/2011 | Flanagan | |
| 2013/0053023 A1* | 2/2013 | Meredith | H04W 24/08 |
| | | | 455/423 |
| 2013/0143592 A1* | 6/2013 | Brisebois | H04W 24/02 |
| | | | 455/456.1 |
| 2013/0210449 A1 | 8/2013 | Flanagan | |
| 2013/0210450 A1 | 8/2013 | Kenington et al. | |
| 2013/0281063 A1* | 10/2013 | Jactat | H04W 24/08 |
| | | | 455/411 |
| 2014/0119334 A1* | 5/2014 | Kazmi | H04W 24/10 |
| | | | 370/330 |
| 2014/0141788 A1 | 5/2014 | Puthenpura et al. | |
| 2014/0171102 A1 | 6/2014 | Murphy et al. | |
| 2014/0171103 A1 | 6/2014 | Murphy et al. | |
| 2015/0189479 A1 | 7/2015 | Kenington et al. | |
| 2015/0334576 A1* | 11/2015 | Sofman | G01S 5/021 |
| | | | 455/456.1 |
| 2016/0050617 A1* | 2/2016 | Hwang | H04L 5/001 |
| | | | 455/434 |
| 2016/0157106 A1* | 6/2016 | Randall | H04W 16/225 |
| | | | 455/446 |
| 2016/0192202 A1* | 6/2016 | Calin | H04W 24/02 |
| | | | 455/446 |
| 2016/0374119 A1* | 12/2016 | Choi | H04W 16/32 |

FOREIGN PATENT DOCUMENTS

| | | |
|---|---|---|
| EP | 2665312 | 11/2013 |
| EP | 2 693 796 A1 | 2/2014 |
| EP | 2704475 | 3/2014 |
| EP | 3057361 | 8/2016 |
| WO | WO 2014/140667 | 9/2014 |
| WO | WO 2015/053000 | 4/2015 |

OTHER PUBLICATIONS

Extended European Search Report corresponding to EP Application No. 15/196,755, dated Mar. 2, 2016, 10 pages.

* cited by examiner

SMALL CELL PLANNING

RELATED APPLICATION

This application claims priority under 35 U.S.C. §119 to U.S. Provisional Patent Application No. 62/201,466, filed on Aug. 5, 2015, the content of which is incorporated by reference herein in its entirety.

BACKGROUND

A network operator may provide wireless access to a core network via a radio access network. Mobile devices may connect to base stations of the radio access network, and may transmit data to the core network, or receive data from the core network, via the base stations. Some base stations may cover a large area, and may be referred to as macrocells. Other base stations may cover a smaller area than the macrocells, and may be referred to as small cells (e.g., microcells, nanocells, femtocells, etc.).

SUMMARY

A method may include receiving, by a device, goal information associated with one or more performance goals associated with a radio access network (RAN). The method may include receiving, by the device, performance information for mobile devices associated with the RAN. The method may include determining, by the device and based on the goal information and the performance information, that at least one performance goal, of the one or more performance goals, is not being achieved within the RAN. The method may include generating, by the device, a small cell plan for improving performance within the RAN toward achievement of the at least one performance goal. The small cell plan may identify a set of locations at which a set of small cells are to be activated, deactivated, or deployed. The method may include outputting, by the device, information associated with the small cell plan.

A non-transitory computer-readable medium may store one or more instructions that, when executed by one or more processors, cause the one or more processors to receive goal information associated with one or more performance goals associated with a radio access network (RAN). The one or more instructions, when executed by the one or more processors, may cause the one or more processors to receive performance information for mobile devices associated with the RAN. The one or more instructions, when executed by the one or more processors, may cause the one or more processors to determine, based on the goal information and the performance information, that at least one performance goal, of the one or more performance goals, is not being achieved within the RAN. The one or more instructions, when executed by the one or more processors, may cause the one or more processors to generate a small cell plan for improving performance within the RAN toward achievement of the one or more performance goals. The small cell plan may identify a set of locations at which a set of small cells are to be activated, deactivated, or deployed. The one or more instructions, when executed by the one or more processors, may cause the one or more processors to store or provide information associated with the small cell plan.

A device may include one or more processors configured to receive information associated with one or more performance goals to be achieved within a radio access network (RAN). The device may receive performance information for mobile devices associated with the RAN. The device may determine that at least one performance goal, of the one or more performance goals, is not being achieved within the RAN. The determining may be based on the information associated with the one or more performance goals and the performance information. The device may generate a small cell plan for improving performance within the RAN toward achievement of the at least one performance goal. The small cell plan may identify a set of locations at which a set of small cells are to be activated, deactivated, or deployed. The device may output information associated with the small cell plan.

DETAILED DESCRIPTION

The following detailed description of example implementations refers to the accompanying drawings. The same reference numbers in different drawings may identify the same or similar elements.

A service provider may wish to deploy one or more small cell base stations to supplement macrocell base stations of a radio access network (RAN), associated with the service provider, via which mobile devices may access a core network. For example, the service provider may wish to deploy one or more small cells in order to achieve a performance goal, such as increasing network capacity at an area of heavy traffic, resolving a coverage gap in an existing RAN, increasing geolocation accuracy of the mobile devices, improving signal quality to the mobile devices, increasing service quality of the mobile devices, improving energy efficiency associated with the mobile devices, reducing interference experienced by the mobile devices, or the like.

In order to achieve the performance goal, the service provider may need to determine when an undesirable condition exists (e.g., a coverage gap, poor geolocation accuracy, poor signal quality, poor service quality, low energy efficiency, high interference, etc.). Moreover, the service provider may need to determine a manner in which to achieve the performance goal, such as one or more locations at which small cells should be deployed, one or more types of small cells that should be deployed, a time of day at which the one or more small cells should be active, or the like.

Implementations described herein may allow a planning device to generate and/or implement a small cell plan, associated with supplementing a macrocell of a RAN, in order to achieve a performance goal, such as increasing network capacity at a hotspot, resolving a coverage gap in an existing RAN, increasing geolocation accuracy of the mobile devices, improving signal quality to the mobile devices, increasing service quality of the mobile devices, improving energy efficiency associated with the mobile devices, reducing interference experienced by the mobile devices, or the like.

Figure 1A:
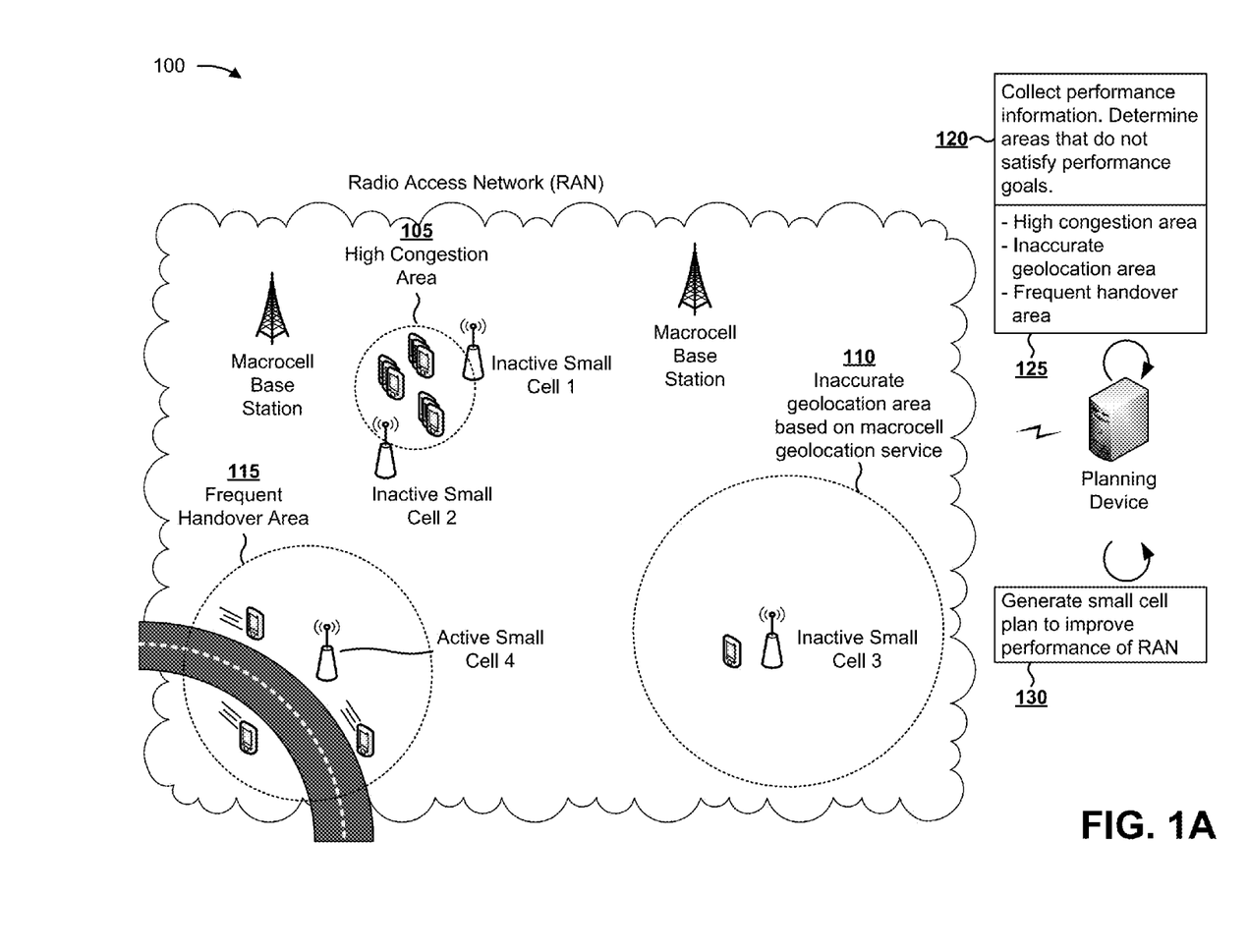
FIGS. 1A and 1B are diagrams of an overview of an example implementation described herein.
Figure 1B:
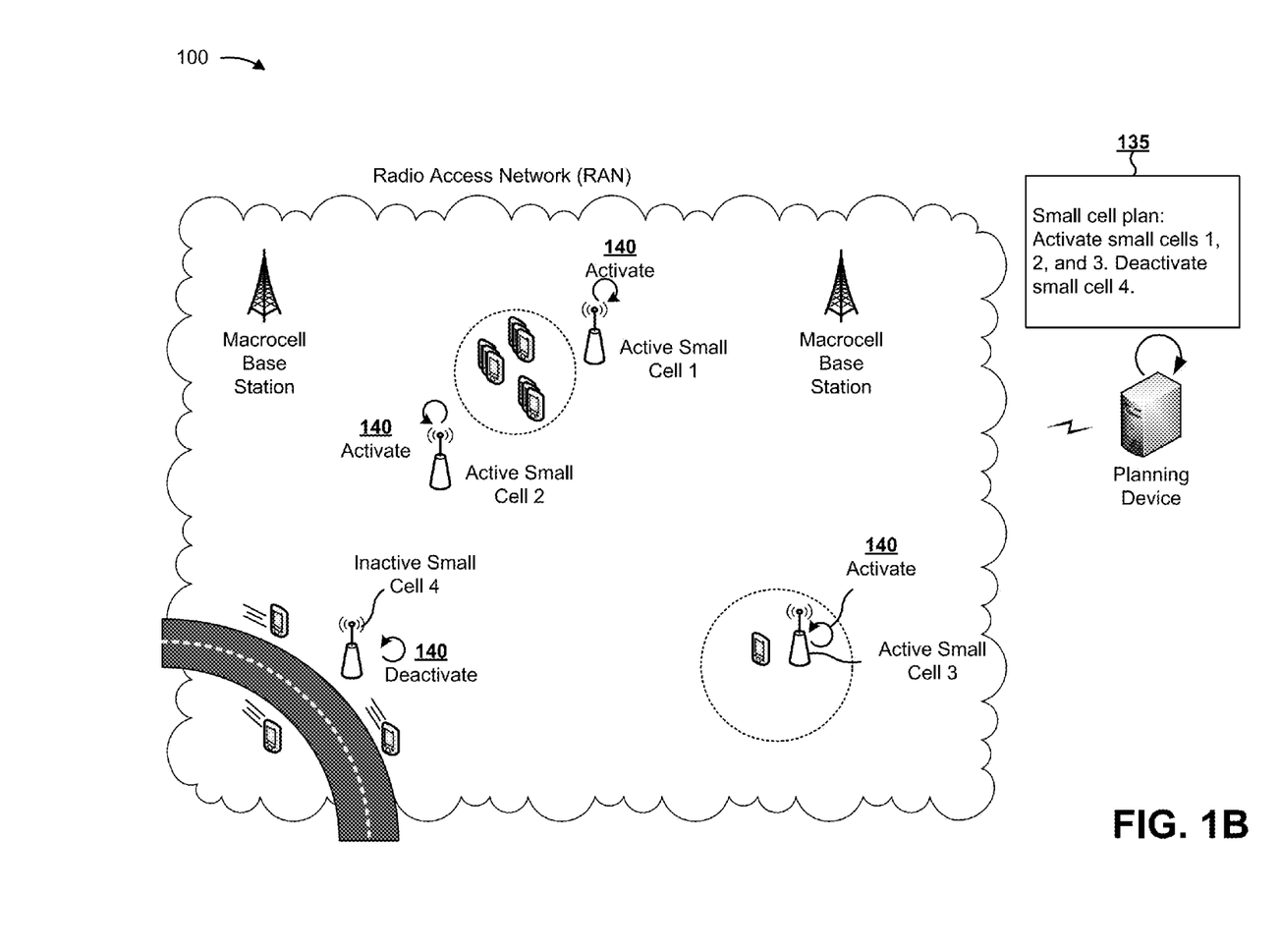

FIGS. 1A and 1B are diagrams of an overview of an example implementation 100 described herein. As shown in FIG. 1A, a RAN may include macrocell base stations and small cell base stations (shown as Small Cells 1 through 4). As further shown, small cells 1, 2, and 3 are inactive (i.e., not providing mobile devices with access to a core network), and small cell 4 is active (i.e., providing mobile devices with access to the core network).

As shown by reference number 105, a first geographic area 105 of the RAN may be associated with relatively high congestion (e.g., relative to a capacity of the RAN in area 105, relative to congestion in other areas of the RAN, etc.). As further shown, small cells 1 and 2 are located near area 105, and are inactive. As shown by reference number 110, a second geographic area 110 of the RAN may be associated with inaccurate geolocation services (e.g., based on topography and/or terrain in area 110, based on Global Positioning System (GPS) signals in area 110 being impeded, etc.). Thus, location information for mobile devices located in area 110 may be inaccurate (e.g., may not satisfy a threshold, etc.).

As shown by reference number 115, a third geographic area 115 of the RAN may be associated with frequent handover of mobile devices with regard to small cell 4. For example, when a mobile device moves into area 115, the mobile device may be handed over from another base station to small cell 4. Based on area 115 including a road, many mobile devices may be handed over to and from small cell 4 in rapid succession (e.g., mobile devices in cars traveling along the road), which may increase network overhead and congestion (e.g., based on handover being network resource-intensive), degrade user experience (e.g., based on rapid handovers increasing the likelihood of dropped calls), and/or introduce gaps in voice or data transmission.

As shown by reference number 120, a planning device may collect performance information. The performance information may relate to the mobile devices and/or the RAN, and may include geolocation information, signal quality information, service quality information, coverage information, power consumption information, interference information, or the like. In other words, the performance information may relate to performance of the RAN with regard to mobile devices that access a core network, associated with the planning device, via the macrocell base stations and/or the small cells of the RAN. In some implementations, the planning device may collect the performance information in real time (e.g., as the performance information is occurring) or in near real time (e.g., in real time or substantially real time).

As further shown by reference number 120, the planning device may determine (e.g., identify) areas that do not satisfy one or more performance goals based on the performance information. For example, a performance goal may include increasing (e.g., comparatively, to satisfy a threshold, etc.) network capacity at a hotspot, resolving a coverage gap in a RAN, increasing geolocation accuracy of the mobile devices, improving signal quality to the mobile devices, increasing service quality of the mobile devices, improving energy efficiency associated with the mobile devices, reducing interference experienced by the mobile devices, or the like. In some implementations, the planning device may receive information that identifies the one or more performance goals from a service provider associated with the RAN, as described in more detail elsewhere herein.

To determine the areas that do not satisfy the performance goals, the planning device may compare the performance information for the RAN with information that identifies threshold performance values. When performance information for a particular area does not satisfy a threshold performance value, the planning device may determine that the particular area does not satisfy a performance goal that corresponds to the threshold performance value. As shown by reference number 125, here, the planning device determines that the high congestion area (e.g., area 105), the inaccurate geolocation area (e.g., area 110), and the frequent handover area (e.g., area 115) do not satisfy respective performance goals. For example, the planning device may determine that performance information associated with area 105 does not satisfy a service level threshold, that performance information associated with area 110 does not satisfy an accuracy threshold, and that performance information associated with area 115 indicates that quantity of handovers of mobile devices exceeds a threshold quantity of handovers.

As shown by reference number 130, based on identifying the areas that do not satisfy the performance goals, the planning device may generate a small cell plan to improve performance of the RAN. The small cell plan may identify one or more configuration changes with regard to the small cells and macrocells of the RAN (e.g., activating or deactivating a base station, reconfiguring a base station, changing a cellular network standard associated with a base station, etc.). Additionally, or alternatively, the small cell plan may identify one or more locations to deploy an additional small cell or macrocell base station. To generate the small cell plan, the planning device may perform a simulation of reconfiguration, activation, or deactivation of base stations of the RAN, and may identify one or more particular base stations to reconfigure, activate, or deactivate based on results of the simulation, as described in more detail elsewhere herein.

As shown in FIG. 1B, and by reference number 135, the small cell plan may indicate to activate small cell 1 and small cell 2 (e.g., corresponding to area 105 in FIG. 1A), and to activate small cell 3 (e.g., corresponding to area 110 in FIG. 1A). Small cells 1 and 2 may be activated to improve network capacity with regard to area 105 in FIG. 1A, thus reducing network congestion in connection with area 105 and reducing power consumption of mobile devices associated with area 105. Small cell 3 may be activated to improve geolocation accuracy with regard to mobile devices near small cell 3. For example, small cell 3 may cover a smaller area than a macrocell base station, so mobile devices that are connected to small cell 3 may be geolocated to a smaller radius than mobile devices that are connected to the macrocell base station. Thus, geolocation accuracy is improved for mobile devices in the vicinity of small cell 3.

As further shown, the small cell plan may indicate to deactivate small cell 4. By causing small cell 4 to be deactivated, the planning device may reduce frequency of handover associated with small cell 4, thereby reducing network congestion and conserving network resources. For example, mobile devices that travel via the road may connect with RAN via a macrocell base station that covers a larger area than small cell 4 and may, thus, be handed over less often than when connecting with the RAN via small cell 4.

As shown by reference number 140, the planning device may cause the small cell plan to be implemented. For example, the planning device may cause small cells 1, 2, and 3 to be activated, and may cause small cell 4 to be deactivated. In some implementations, the planning device may automatically reconfigure small cells 1 through 4. Additionally, or alternatively, the planning device may generate a service ticket that identifies small cells 1 through 4 and that indicates an action to be performed. In some implementations, the planning device may reconfigure one or more of the macrocell base stations when causing the small cell plan to be implemented, as described in more detail elsewhere herein.

In this way, the planning device improves radio access network performance by generating a small cell plan. Thus, network congestion is reduced, network resources are conserved, and performance and efficiency of mobile devices and base stations are improved. Thus, experience of mobile users located in the area is improved and revenue of the mobile operator/carrier may be increased.

As indicated above, FIGS. 1A and 1B are provided merely as examples. Other examples are possible and may differ from what was described with regard to FIGS. 1A and 1B.

Figure 2:
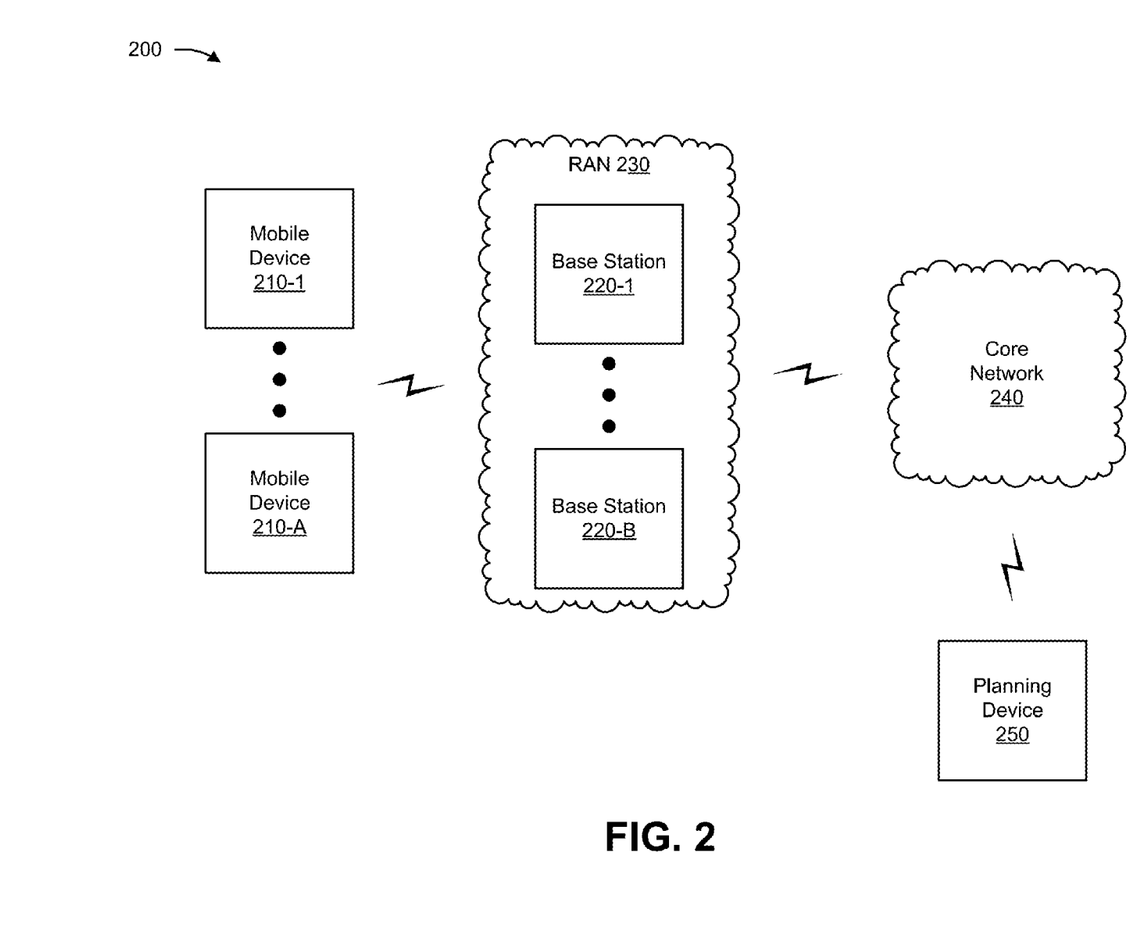
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include one or more mobile devices 210-1 through 210-A (A≥1) (hereinafter referred to collectively as mobile devices 210, and individually as mobile device 210), one or more base stations 220-1 through 220-B (B≥1) (hereinafter referred to collectively as base stations 220, and individually as base station 220) included in a radio access network (RAN) 230, a core network 240, and a planning device 250. Devices of environment 200 may interconnect via wired connections, wireless connections, or a combination of wired and wireless connections.

Mobile device 210 may include one or more devices capable of communicating with base stations 220 and/or devices included in a network (e.g., core network 240). For example, mobile device 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable computing device (e.g., a pair of smart eyeglasses, a smart watch, etc.), and/or a similar device. Mobile device 210 may send traffic to and/or receive traffic from core network 240 (e.g., via base stations 220 of RAN 230, etc.). In some implementations, mobile device 210 may be capable of collecting, determining, storing, and/or providing performance information associated with mobile device 210 (e.g., for use in generating the small cell plan).

Base station 220 may include one or more devices capable of transferring traffic, such as audio, video, text, and/or other traffic, destined for and/or received from mobile device 210 via RAN 230. For example, in some implementations, base station 220 may include an evolved nodeB (eNB) (e.g., when RAN 230 includes a long term evolution (LTE) network) that receives traffic from and/or sends traffic to core network 240 and/or planning device 250. Additionally, or alternatively, base station 220 may include another type of base station associated with another type of RAN 230, such as a base station included in a Global System for Mobile (GSM) Communications radio access network (GRAN), a GSM Edge radio access network (GERAN), a Universal Mobile Telecommunications System radio access network (U-TRAN), a WiFi network, or the like. Base station 220 may send traffic to and/or receive traffic from mobile device 210 via an air interface. In some implementations, base station 220 may include a small cell base station, such as a base station of a microcell, a picocell, and/or a femtocell. Additionally, or alternatively, base station 220 may include a large cell base station, such as a base station of a macrocell.

RAN 230 may include a radio access network that includes one or more base stations 220. For example, RAN may include a GSM Communications RAN, a GERAN, a U-TRAN, a LTE network, a WiFi network, and/or one or more other types of radio access networks.

Core network 240 includes one or more wired and/or wireless networks that send and/or receive information via one or more RANs 230. For example, core network 240 may include a cellular network (e.g., an LTE network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a wireless local area network (WLAN), or the like, and/or a combination of these or other types of networks.

Planning device 250 includes a device associated with generating a small cell plan in accordance with implementations described herein. For example, planning device 250 may include a computing device, such as a server or a group of servers. In some implementations, planning device 250 may include a self-organizing or self-optimizing network system (SON system).

In some implementations, planning device 250 may include one or more devices in a cloud computing environment. The cloud computing environment includes an environment that hosts planning device 250. The cloud computing environment may provide computation, software, data access, storage, etc. services that do not require end-user knowledge of a physical location and configuration of system(s) and/or device(s) that hosts planning device 250. The cloud computing environment may include a group of computing resources. A computing resource includes one or more personal computers, workstation computers, server devices, or another type of computation and/or communication device. In some implementations, a computing resource may host planning device 250. The cloud resources may include compute instances executing in a computing resource, storage devices provided in a computing resource, data transfer devices provided by a computing resource, etc. In some implementations, a computing resource may communicate with other computing resources via wired connections, wireless connections, or a combination of wired and wireless connections.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
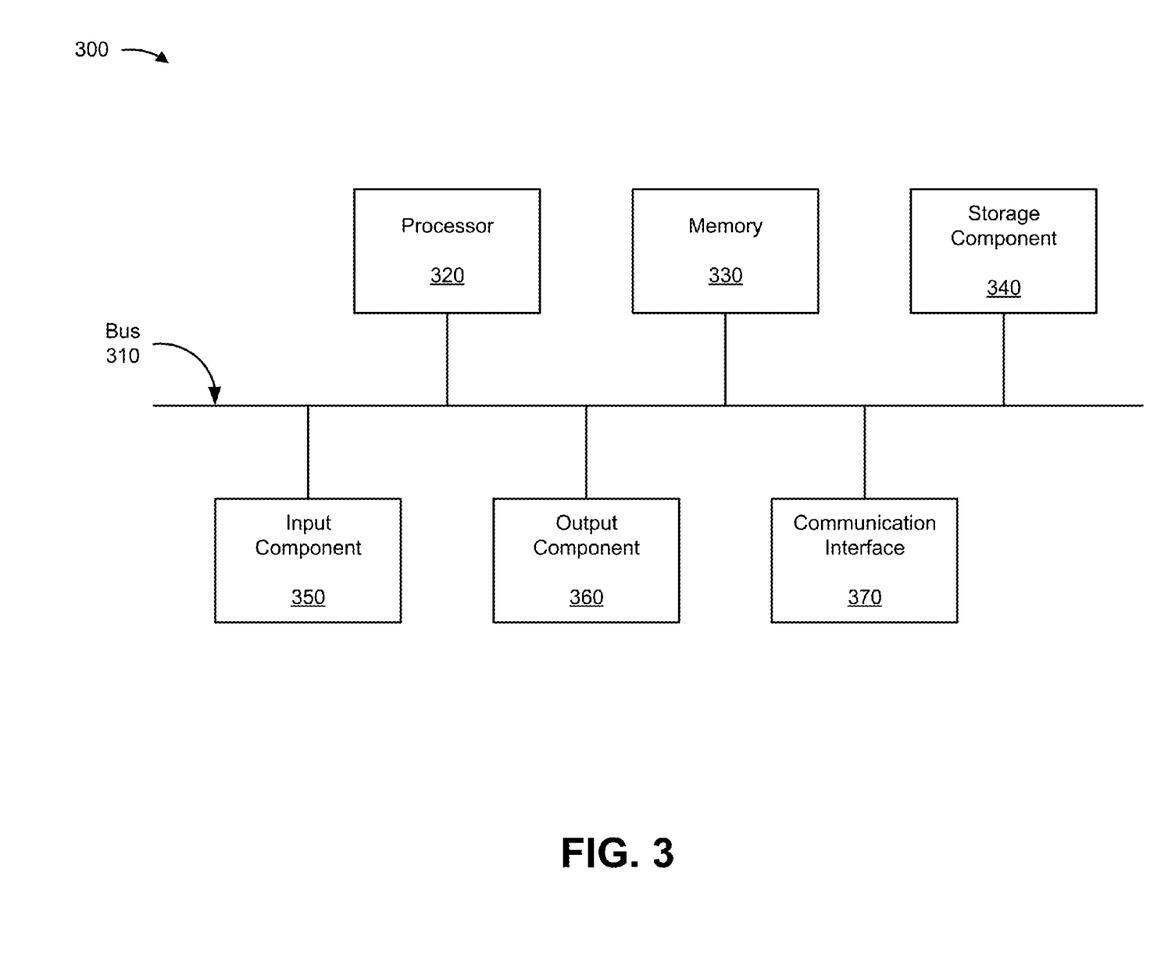
FIG. 3 is a diagram of example components of one or more devices of FIG. 2.

FIG. 3 is a diagram of example components of a device 300, which may correspond to mobile device 210, base station 220, and/or planning device 250. In some implementations, each of mobile device 210, base station 220, and/or planning device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
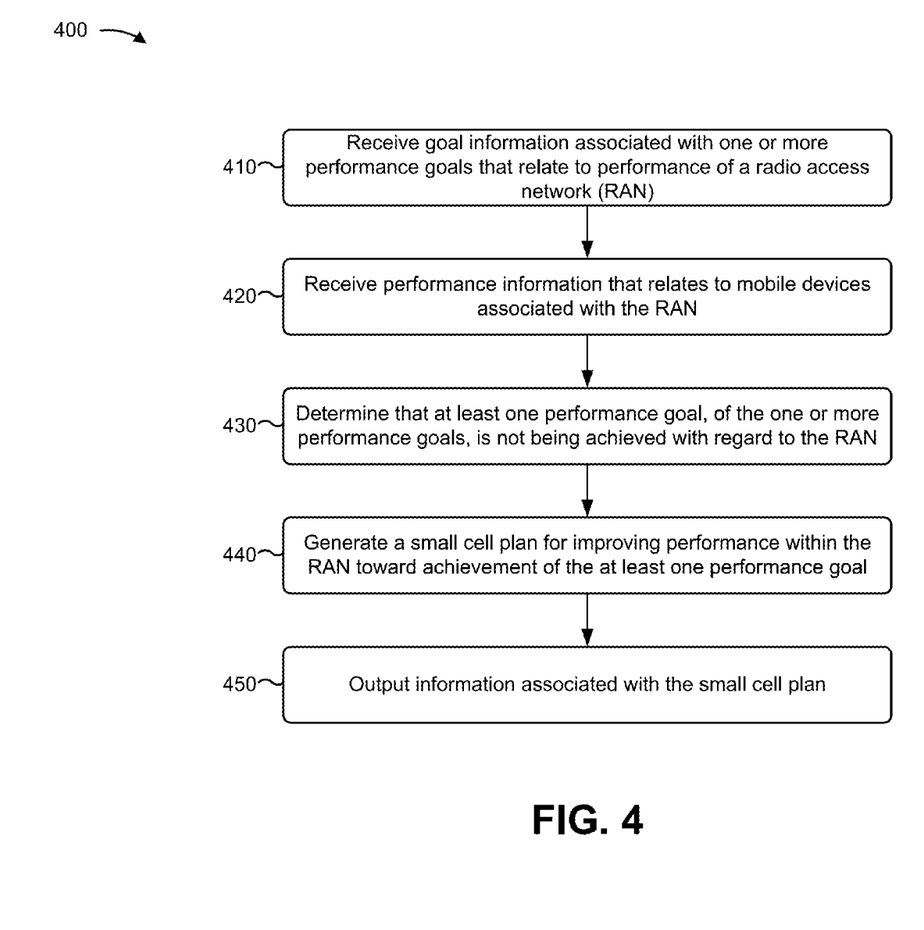
FIG. 4 is a flow chart of an example process for generating a small cell plan for a radio access network.

FIG. 4 is a flow chart of an example process 400 for generating a small cell plan for a radio access network. In some implementations, one or more process blocks of FIG. 4 may be performed by planning device 250. In some implementations, one or more process blocks of FIG. 4 may be performed by another device or a group of devices separate from or including planning device 250, such as mobile device 210 and/or base station 220.

As shown in FIG. 4, process 400 may include receiving goal information associated with one or more performance goals that relate to performance of a RAN (block 410). For example, planning device 250 may receive goal information. The goal information may include information that describes one or more goals to be achieved with regard to RAN 230. For example, a performance goal may include increasing (e.g., comparatively, to satisfy a threshold, etc.) network capacity at a congested area, resolving a coverage gap in RAN 230, increasing geolocation accuracy of mobile devices 210, improving signal quality to mobile devices 210, increasing service quality of mobile devices 210, improving energy efficiency associated with mobile devices 210, reducing interference experienced by mobile devices 210, or the like.

In some implementations, the goal information associated with the performance goal may include information that identifies the performance goal, threshold information associated with the performance goal (e.g., a minimum value of performance information required to satisfy the performance goal, a maximum value of performance information required to satisfy the performance goal, etc.), or the like.

As an example, goal information for a performance goal that relates to geolocation accuracy may identify a minimum radius of uncertainty for a geolocation measurement. As another example, goal information for a performance goal that relates to signal quality may identify a threshold signal to noise ratio, a threshold channel quality indicator, or the like. As yet another example, goal information for a performance goal that relates to service quality may identify a service level agreement, a minimum threshold bitrate for a service, or the like.

In some implementations, planning device 250 may receive goal information associated with multiple performance goals. In such a case, each performance goal may be assigned a priority (e.g., such that a first performance goal has a higher priority than a second performance goal, the second performance goal has a higher priority than a third performance goal, etc.). For example, planning device 250 may receive or determine priority information that identifies the priorities to be assigned to the performance goals. In some implementations, planning device 250 may generate the small cell plan based on priorities of the multiple performance goals (e.g., such that a higher priority performance goal is assigned more weight than a lower priority performance goal during generation of the small cell plan), as described in more detail elsewhere herein. Additionally, or alternatively, planning device 250 may generate the small cell plan based on multiple, different performance goals without using priority information associated with the multiple, different performance goals. For example, planning device 250 may generate the small cell plan based on a best fit analysis, a regression analysis, or the like, as described in more detail elsewhere herein.

In some implementations, the goal information may include temporal information. For example, the goal information may identify a particular time at which the performance goal is to be measured or achieved, such as a time of day, a day of the week, a particular date (e.g., a date on which an event is to take place, etc.). The temporal information may permit planning device 250 to tailor the small cell plan for a particular (e.g., future) time in accordance with the performance goal. In other words, the temporal information may permit planning device 250 to generate a small cell plan that varies over time, and to adjust the variation of the small cell plan based on the temporal information (e.g., to improve or optimize performance and adjustment of RAN 230 based on performance of RAN 230 at particular times). For example, based on temporal information that identifies a particular network capacity at a rush hour time, planning device 250 may increase a quantity of available small cell base stations 220 in particular locations at the rush hour time. As another example, the small cell plan may identify small cells to be activated or deactivated at particular times, and planning device 250 may adjust the time-based variations of the small cell plan (e.g., may select additional small cells to activate or deactivate) as planning device 250 receives temporal information.

In some implementations, the goal information may include location information. For example, the goal information may include information that identifies a location associated with the performance goal, such as a geographic area covered by RAN 230, or a particular portion of the geographic area, such as a set of city blocks, a particular building, a stadium, or the like. Additionally, or alternatively, the location information may include information relating to the geographic area (e.g., weather patterns for the geographic area, topography of the geographic area, known obstacles in the geographic area, etc.). The location information may permit planning device 250 to tailor the small cell plan for a particular (e.g., specific) location in accordance with the performance goal.

In some implementations, the goal information may include budget information. For example, the goal information may identify a threshold monetary cost associated with deploying one or more small cell base stations 220 to achieve a performance goal, a threshold cost in resources (e.g., a minimum quantity of base stations 220, a maximum quantity of base stations 220, etc.) to be deployed, a cost of base station 220 when obtained from a particular manufacturer, or the like. The budget information may permit planning device 250 to tailor the small cell plan for a particular budget provided by the service provider.

In some implementations, planning device 250 may automatically receive the goal information (e.g., when planning device 250 stores or has access to a default set of performance goals). Additionally, or alternatively, planning device 250 may receive the goal information based on user input. Additionally, or alternatively, planning device 250 may determine the goal information. For example, planning device 250 may implement a performance goal, and may adjust the performance goal based on an effect of implementing the performance goal with regard to RAN 230 (e.g., based on a machine learning algorithm, etc.).

As further shown in FIG. 4, process 400 may include receiving performance information that relates to mobile devices associated with the RAN (block 420). For example, planning device 250 may receive performance information that relates to mobile devices 210. The mobile devices 210 may be associated with RAN 230. For example, the mobile devices 210 may have received data from and/or transmitted data to core network 240 via one or more base stations 220 of RAN 230 (e.g., one or more small cells and/or one or more macrocells).

The performance information may include information, associated with mobile devices 210 that access core network 240 via RAN 230, that may be used to evaluate conditions within RAN 230 and/or perform a simulation associated with generating the small cell plan. For example, the performance information may include geolocation information, signal quality information, service quality information, coverage information, power consumption information, interference information, or the like.

As particular examples, the performance information may include information relating to a transmit power level associated with mobile device 210, a downlink path loss between base station 220 and mobile device 210, a downlink received signal code power (RSCP) associated with mobile device 210, a downlink received energy per chip (Ec) for mobile device 210, a downlink noise power density (NO) for mobile device 210, a received signal reference quality (RSRQ) for mobile device 210, a power headroom identifier for mobile device 210, a channel quality indication (CQI), a sub-band CQI, information according to an E-UTRA standard (e.g., LTE 36.331, LTE 36.423, etc.), a radio frequency (RF) map, or the like. Additionally, or alternatively, the performance information may include an uplink received signal strength indicator (RSSI) associated with base station 220, an uplink signal-to-noise ratio (SNR) for information received by base station 220, a signal-to-interference-plus-noise (SINR) ratio, a downlink propagation loss for base station 220, a received total wideband power (RTWP), or the like.

In some implementations, the performance information may relate to a service quality of a network service. A network service may include, for example, a Voice over IP (VoIP) service, a Voice over LTE (VoLTE) service, an Internet messaging service, a video calling service, or the like. As an example, a performance goal may identify a service level agreement for a network service, and performance information for the network service may include information indicating whether the service level agreement is satisfied (e.g., a service bearer degradation value, a mid-call degradation value, a bandwidth, a call quality measurement, etc.). As another example, a performance goal may identify a service level associated with a device, and performance information corresponding to the device may indicate whether the device has provided the service level with regard to network services provided by the device.

As other examples, the performance information relating to a network service may identify a bearer rate (e.g., data rate or bandwidth), a codec rate (e.g., data rate or bandwidth), a jitter associated with a service (e.g., a displacement of signal between two devices), a mean opinion score (MOS) rating, a packet loss rating, a throughput, a service map, or the like.

In some implementations, the performance information may relate to coverage of a particular network standard (e.g., LTE, 3G, WiFi, etc.). For example, the performance information may include a map of RSCP values, and based on the map of RSCP values, planning device 250 may determine a coverage area of a UMTS service. As another example, a map of RF signal strength for a particular network technology may identify a coverage area of the particular network technology.

As yet another example, handover information, that identifies locations of and/or a quantity of handovers from a first cellular network standard (e.g., LTE) to a second cellular network standard (e.g., 3G), may be used to determine coverage area of the first cellular network standard and/or the second cellular network standard (e.g., may identify borders of the coverage area based on where mobile devices 210 are handed over). As still another example, the performance information may indicate that mobile device 210 is capable of connecting to an LTE network, and is not connected to an LTE network in a particular location. In such a case, the performance information may identify an LTE dead zone in the particular location.

As another example, the performance information may include radio link failure (RLF) reports that identify call loss based on poor RF quality or coverage. In such a case, the performance information may identify coverage areas (e.g., areas of poor coverage) based on locations associated with the RLF reports. As yet another example, the performance information may include a triggered measurement report relating to network technology coverage (e.g., an A1 report based on LTE coverage satisfying a threshold, an A2 report based on LTE coverage not satisfying a threshold, etc.). As still another example, the performance information may identify spacing of base stations 220 (e.g., small cell base stations 220 and/or macrocell base stations 220), which may permit planning device 250 to predict or determine areas of adequate coverage and/or inadequate coverage.

In some implementations, planning device 250 may receive the performance information from mobile device 210 (e.g., when the performance information includes a measurement determined by mobile device 210). Additionally, or alternatively, planning device 250 may receive the performance information from base station 220 (e.g., when the performance information includes a measurement determined by base station 220, and/or when base station 220 provides the performance information to planning device 250 from mobile device 210). In some implementations, planning device 250 may receive the performance information periodically (e.g., based on reports from mobile device 210 and/or base station 220). Additionally, or alternatively, planning device 250 may receive the performance information based on requesting the performance information, based on another device providing a batch of performance information, or the like. Additionally, or alternatively, planning device 250 may receive performance information corresponding to a particular period of time (e.g., a period with high network congestion, a period associated with poor network performance, etc.). Additionally, or alternatively, planning device 250 may collect the performance information in real time (e.g., as the performance information is occurring) or in near real time (e.g., in real time or substantially real time).

In some implementations, planning device 250 may obtain additional information based on the performance information. For example, based on determining that a set of mobile devices 210 is associated with geolocation information that does not satisfy a threshold accuracy, planning device 250 may cause the set of mobile devices 210 to determine more accurate geolocation information (e.g., based on GPS, etc.). As another example, based on determining that a threshold quantity of mobile devices 210 are present in a particular area, planning device 250 may obtain signal quality measurements from the mobile devices 210 included in the threshold quantity.

In some implementations, planning device 250 may receive or obtain other information relating to mobile devices 210, users associated with mobile devices 210, and/or operator information associated with RAN 230. The other information may include information, other than cellular network measurements, that may be used to generate the small cell plan. For example, the other information may include information associated with a small cell that may be deployed within the RAN, such as a type of the small cell (e.g., a vendor, a manufacturer), capability information of the small cell, or the like.

As another example, the other information may include environmental information, such as deployment height information (e.g., a height at which a small cell may be physically deployed), road information and/or building information associated with a geographic area covered by RAN 230, information associated with access to core network 240 (e.g., information that identifies a location at which a connection to core network 240 may be made within RAN 230), restricted area information associated with the geographic area covered by RAN 230 (e.g., a geographic area in which a small cell base station 220 may not be deployed, such as a military base), or the like.

As still another example, the other information may include trend information associated with mobile devices 210, such as information that identifies one or more types of subscribers (e.g., pre-paid, post-pay, etc.) typically associated with RAN 230, traffic pattern information associated with mobile devices 210 moving through RAN 230, one or more velocities associated with one or more mobile devices 210, device capabilities of mobile devices 210 associated with RAN 230, or the like.

As yet another example, the other information may include operator information associated with multiple operators associated with RAN 230 (e.g., when multiple different operators use a same RAN 230 to access different core networks 240). For example, in some cases, a first network operator may use a RAN 230, provided by a second network operator, to provide access to core network 240 associated with the first network operator. In such a case, the other information may include information that identifies the first network operator and/or the second network operator. Additionally, or alternatively, the other information may include information that identifies subscribers associated with the first or second network operator, network technologies associated with the first or second network operator, mobile devices 210 associated with the first or second network operator, or the like. Planning device 250 may use the other information to generate a small cell plan to improve performance of RAN 230 for both of the network operators, as described in more detail elsewhere herein.

As still another example, the other information may include information associated with determining whether mobile devices 210 are located indoors or outdoors (e.g., when the small cell plan may include small cell base stations 220 that may be deployed indoors or outdoors). For example, the other information may indicate whether a particular mobile device 210 is historically located indoors or outdoors, a threshold velocity for determining whether the particular mobile device 210 is located indoors or outdoors, location information that identifies indoor areas and/or outdoor areas, a signal strength threshold based on which to determine whether mobile device 210 is located indoors or outdoors, or the like. Based on this information, planning device 250 may generate a small cell plan that takes into account whether mobile devices 210 are located indoors or outdoors, thereby improving performance of RAN 230.

In some implementations, planning device 250 may determine other information based on the planning information. For example, assume that location information for a particular mobile device 210 does not change, and assume that a set of neighboring mobile devices 210 associated with the particular mobile device 210 has changed. This may indicate that the particular mobile device 210 has moved upward or downward in a building (e.g., to be near the neighboring mobile devices 210). Planning device 250 may determine location information for the particular mobile device 210 and/or the set of neighboring mobile devices 210 based on the indication that the particular mobile device 210 has moved upward or downward in the building. Thus, planning device 250 permits improvement of performance of RAN 230 based on derived location information.

As further shown in FIG. 4, process 400 may include determining that at least one performance goal, of the one or more performance goals, is not being achieved with regard to the RAN (block 430). For example, planning device 250 may determine that at least one performance goal is not being achieved with regard to RAN 230 and/or with regard to mobile devices 210 connected with core network 240 via RAN 230. In some implementations, planning device 250 may determine that multiple performance goals are not being achieved (e.g., based on priorities associated with the multiple performance goals). Planning device 250 may generate a small cell plan to improve performance with regard to the at least one performance goal, as described in more detail in connection with block 440, below.

To determine that the at least one performance goal is not being achieved, planning device 250 may use the performance information to determine whether a condition, associated with the performance goal, is satisfied with regard to RAN 230. For example, planning device 250 may, based on the performance information, determine whether mobile devices 210 located in a geographic area, covered by RAN 230, experience poor geolocation accuracy, poor signal strength, poor quality of service, and so on.

As a more particular example, assume that a particular area is associated with a performance goal of a throughput of 500 gigabits (Gb) per second. Assume further that planning device 250 receives performance information indicating that a base station 220 of the particular area provides a throughput of 250 Gb per second. In such a case, planning device 250 may determine that the performance goal is not being achieved with regard to RAN 230.

As another example, assume that a performance goal indicates that a geolocation service of RAN 230 is to provide geolocation information that is accurate to a radius of 5 meters. Assume further that performance information associated with RAN 230 indicates that geolocation information in a particular geographic area is accurate to a radius of 25 meters. In such a case, planning device 250 may determine that the performance goal is not being achieved with regard to the particular geographic area.

In some implementations, the at least one performance goal may require achievement of a combination of performance goals. For example, if one or more performance goals, of the combination of performance goals, are not achieved, planning device 250 may determine that the combination of performance goals has not been achieved. As another example, if a threshold quantity (e.g., a majority, a particular percentage, etc.) of the combination of performance goals fails, planning device 250 may determine that the combination of performance goals has not been achieved. As yet another example, planning device 250 may generate a score based on the combination of performance goals (e.g., based on performance goals that were not achieved, based on a difference between a threshold value of a performance goal and an observed value of performance information, etc.), and may determine whether the combination of performance goals has been achieved based on the score (e.g., based on whether the score satisfies a threshold).

As further shown in FIG. 4, process 400 may include generating a small cell plan for improving performance within the RAN toward achievement of the at least one performance goal (block 440). For example, planning device 250 may generate the small cell plan based on the goal information associated with the performance goal, the performance information, and/or the other information. Planning device 250 may, based on the goal information and the performance information, identify one or more locations at which the performance goal is not being achieved, as described in connection with block 430, above. Planning device 250 may then perform, based on the performance information and the other information, one or more simulations in order to identify possible locations at which one or more small cells may be deployed in order to achieve the performance goal.

To perform the one or more simulations, planning device 250 may simulate placement of a small cell in particular locations within RAN 230, and may predict an effect of placing the small cell in the particular locations. For example, planning device 250 may predict the effect based on a model that is trained based on an artificial intelligence algorithm, such as a machine learning algorithm, a neural network algorithm, or the like. Planning device 250 may train the model, using the artificial intelligence algorithm, based on information regarding past deployment of small cells and effects of the past deployment of small cells on RAN 230 or another radio access network. Planning device 250 may input, to the model, information regarding RAN 230 and/or the small cells to be simulated, and the model may output the predicted effect of deploying, activating, deactivating, or reconfiguring the small cells.

Continuing the above example, planning device 250 may update the model based on the small cell plan. For example, after implementing the small cell plan, planning device 250 may determine an observed effect of implementing the small cell plan. Planning device 250 may use the observed effect and the small cell plan as a training set for the model, and may update the model based on the artificial intelligence algorithm and the training set. Thus, planning device 250 improves accuracy of the model, thereby improving performance of RAN 230. Further, by training the model to output improved small cell plans, planning device 250 conserves network resources that would otherwise be used to repeatedly reconfigure base stations 220 that have been configured based on sub-optimal small cell plans.

In some implementations, planning device 250 may simulate placement of small cells in multiple, different locations. In such cases, planning device 250 may select a best location based on one or more scores associated with the simulation. Additionally, or alternatively, planning device 250 may select the multiple, different locations, and may determine a particular (e.g., improved, optimal, etc.) configuration of small cells associated with the multiple, different locations. In such a case, planning device 250 may determine the particular configuration based on a model, based on an artificial intelligence algorithm, based on simulating the effect of the particular configuration, or the like.

In some implementations, planning device 250 may generate the small cell plan based on a regression analysis, a multiple regression analysis, a best fit analysis, or the like. A regression analysis may fit a solution (i.e., a configuration and/or placement of small cells associated with a small cell plan) to target values of variables (i.e., a set of performance goals). Based on the regression analysis, planning device 250 may reduce (e.g., minimize) a measure of difference between solution values of the solution and the target values. For example, when performing a least squares regression analysis, planning device 250 may reduce (e.g., minimize) a sum of squares of differences between the solution values and the target values. Thus, planning device 250 may determine a small cell plan based on a best fit solution for a set of performance goals, thereby improving network performance based on the set of performance goals.

In some implementations, planning device 250 may generate the small cell plan based on priorities associated with performance goals. For example, assume that RAN 230 is associated with a first performance goal and a second performance goal. Assume further that an improvement with regard to the first performance goal causes a decline in performance with regard to the second performance goal. That is, assume that the first performance goal and the second performance goal are competing performance goals. In such a case, planning device 250 may prioritize one of the first performance goal and the second performance goal based on priority information associated with the first performance goal and the second performance goal. For example, when the first performance goal is associated with a higher priority than the second performance goal, planning device 250 may assign a higher weight to the first performance goal than the second performance goal when determining the small cell plan, and may thereby determine a small cell plan that improves performance of RAN 230 with regard to the first performance goal more than with regard to the second performance goal. Additionally, or alternatively, planning device 250 may determine a small cell plan based on a regression analysis, to reduce (e.g., minimize) a detrimental effect with regard to the second performance goal while improving performance with regard to the first performance goal. Thus, planning device 250 balances competing performance goals, thereby improving network performance when competing performance goals are to be satisfied.

In some implementations, the small cell plan may identify one or more locations at which one or more small cell base stations 220 may be activated, deactivated, reconfigured, or deployed in order to achieve the performance goal. For example, the small cell plan may identify a particular location within a geographic area described by the goal information, such as a set of city blocks, a building, or the like. Additionally, or alternatively, the small cell plan may identify one or more "best" locations at which the one or more small cells may be activated, deactivated, reconfigured, or deployed in order to improve performance toward achieving the performance goal (e.g., when planning device 250 determines that achieving the performance goal is not likely or not possible). Additionally, or alternatively, in a situation when mobile devices 210 are nearly stationary at some times and moving at others (e.g., when mobile devices 210 are in an automobile traveling through a city), the small cell plan may indicate to configure as separate small cells or configure one or more of the small cell transceivers to create a single larger cell. Thus, planning device 250 improves network performance, even in the situation where the performance goal cannot be achieved.

Additionally, or alternatively, the small cell plan may identify one or more types of small cells to be activated, deactivated, reconfigured, or deployed (e.g., UMTS, LTE, combined UMTS/LTE, WiFi, etc.). For example, when a performance goal that relates to coverage of an LTE network has not been achieved in a particular area, the small cell plan may indicate that an LTE small cell base station 220 is to be deployed in the particular area. Thus, coverage of RAN 230 in the particular area may be improved, thereby improving reception of mobile devices 210 and/or reducing power consumption of the mobile devices 210.

In some implementations, the small cell plan may include information associated with return on investment for a geographic area (e.g., whether an area covered by a macrocell base station 220 may be more effectively covered by one or more small cell base stations 220). For example, based on budget information that identifies a cost associated with the macrocell base station 220 and the one or more small cell base stations 220, planning device 250 may determine whether the area can be more cost-effectively covered by the macrocell base station 220, the one or more small cell base stations 220, and/or a combination of macrocell and one or more small cell base stations 220. As other examples, planning device 250 may determine a potential monetary benefit of deployment (e.g., estimated new revenue from increased capacity, estimated retained revenue due to increased service levels to customers, advertising revenue from better geolocation, an increase or decrease in operating costs, etc.). Thus, planning device 250 may reduce cost and improve performance of RAN 230

In some implementations, the small cell plan may include temporal information. For example, when a particular area of RAN 230 does not achieve a performance goal at a particular time (e.g., rush hour, a time at which peak traffic occurs, a time at which a large data throughput occurs, etc.), the small cell plan may indicate to activate small cells, associated with the particular area, during the particular time period (e.g., may define a schedule for activation and deactivation of the small cells). Thus, performance of RAN 230 may be improved during times at which adverse network performance is likely to occur.

In some implementations, the small cell plan may identify one or more types of transport links that may be utilized to improve network performance. For example, planning device 250 may determine backhaul bandwidth requirements based on small cell base stations 220 to be deployed, activated, and/or deactivated, and may identify transport links to be associated with the small cell base stations 220 based on the backhaul bandwidth requirements. The transport links may include dark fiber links, leased fiber links, copper links, radio links, free space optical links, or the like. In some implementations, the small cell plan may identify a degree of coordination between the proposed base stations 220 of the small cell plan. For example, the small cell plan may identify coordination data that is to be exchanged between the proposed base stations 220, and may identify performance requirements associated with the coordination data. Thus, planning device 250 improves coordination between small cell base stations 220 and improves network bandwidth and performance.

As further shown in FIG. 4, process 400 may include outputting information associated with the small cell plan (block 450). For example, planning device 250 may output information associated with the small cell plan. In some implementations, planning device 250 may cause one or more devices (e.g., base stations 220) to implement the small cell plan (e.g., automatically). For example, planning device

250 may activate, deactivate, or reconfigure one or more small cell base stations 220 and/or one or more macrocell base stations 220 to implement the small cell plan. Thus, planning device 250 improves performance of RAN 230, thereby reducing power consumption and improving cellular reception of mobile devices 210.

As another example, planning device 250 may activate one or more small cell base stations 220, and may reconfigure one or more macrocell base stations 220 based on coverage areas of the one or more small cell base stations 220 (e.g., to reduce interference and/or redundant coverage of the small cell and/or macrocell base stations 220). To reconfigure base station 220, planning device 250 may cause boresight angles, antenna tilt, transmit power, transmit channels, or the like, of base station 220, to be modified. Thus, planning device 250 improves performance of the small cell base stations 220 and/or the macrocell base station 220, thus improving performance of RAN 230.

In some implementations, planning device 250 may provide the small cell plan and/or information regarding the small cell plan to another device. For example, planning device 250 may provide the small cell plan for storage and/or implementation. As another example, planning device 250 may automatically generate a service ticket based on the small cell plan. The service ticket may identify one or more base stations to be installed, activated, or deactivated, may identify configuration information based on which the small cell plan is to be implemented, or the like. Based on the service ticket, a technician may implement the small cell plan. For example, the technician may install, uninstall, and/or configure one or more base stations 220.

In some implementations, planning device 250 may adjust one or more performance goals based on implementing a small cell plan. For example, planning device 250 may determine a result of implementing a small cell plan to improve performance with regard to a performance goal, and may adjust a threshold associated with the performance goal based on whether the small cell plan is effective (e.g., whether the small cell plan satisfies a metric with regard to the performance goal, with regard to performance of RAN 230, etc.). Thus, planning device 250 may determine more accurate performance goals, thereby improving the efficiency of resource allocation of RAN 230.

As another example, planning device 250 may adjust priorities associated with multiple, different performance goals. For example, when planning device 250 determines that a first performance goal is closer to achievement than a second performance goal after implementing a small cell plan, planning device 250 may adjust priorities associated with the first performance goal and the second performance goal (e.g., to cause achievement of the first performance goal to be prioritized over achievement of the second performance goal, or to cause achievement of the second performance goal to be prioritized over achievement of the first performance goal). By prioritizing achievement of the first performance goal, planning device 250 improves a likelihood that the first performance goal is achieved. By prioritizing achievement of the second performance goal, planning device 250 improves network performance with regard to the performance goals that are furthest from achievement.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, planning device 250 improves network performance, reduces congestion, and increases throughput of RAN 230 based on generating small cell plans for activating, deactivating, and/or modifying base stations 220 of RAN 230.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
  receiving, by a device, goal information associated with one or more performance goals associated with a radio access network (RAN),
    where the one or more performance goals include at least one performance goal that identifies a threshold quantity of handovers associated with a particular area;
  receiving, by the device, performance information for mobile devices associated with the RAN;

determining, by the device and based on the goal information and the performance information, that the at least one performance goal, of the one or more performance goals, is not being achieved within the RAN,
the at least one performance goal not being achieved based on the performance information identifying a quantity of handovers that is greater than the threshold quantity of handovers;
generating, by the device, a small cell plan for improving performance within the RAN toward achievement of the at least one performance goal,
the small cell plan to identify a set of locations at which a set of small cells are to be activated, deactivated, or deployed; and
outputting, by the device, information associated with the small cell plan.

2. The method of claim 1, where the goal information includes location information, temporal information, or budget information associated with the one or more performance goals; and
where generating the small cell plan comprises:
generating the small cell plan based on the location information, the temporal information, or the budget information.

3. The method of claim 1, where generating the small cell plan comprises:
performing a simulation, associated with a geographic area covered by the RAN, to identify the set of locations at which the set of small cells are to be activated, deactivated, or deployed.

4. The method of claim 3, further comprising:
determining first information, second information, or third information associated with the RAN,
the first information relating to environmental features of the set of locations,
the second information relating to one or more trends associated with the mobile devices, and
the third information relating to an operator associated with the RAN; and
performing the simulation based on the first information, the second information, or the third information.

5. The method of claim 1, where the one or more performance goals include a plurality of performance goals; and
where the goal information includes priority information associated with the plurality of performance goals,
the priority information identifying priorities of the plurality of performance goals relative to each other; and
where generating the small cell plan comprises:
generating the small cell plan based on the priority information.

6. The method of claim 1, where outputting the information associated with the small cell plan comprises:
automatically activating or deactivating a small cell, of the set of small cells, at a location in the set of locations, the small cell being activated or deactivated based on a set of times or a modification of a set of times associated with the small cell plan.

7. The method of claim 1, where outputting the information associated with the small cell plan comprises:
automatically generating a service ticket associated with deploying the set of small cells at the set of locations.

8. The method of claim 1, where the one or more performance goals include at least one of:
increasing network capacity,
resolving a coverage gap in the RAN,
increasing geolocation accuracy of the mobile devices,
improving signal quality to the mobile devices,
increasing service quality of the mobile devices,
improving energy efficiency associated with the mobile devices,
reducing service quality in a particular area, or
reducing interference experienced by the mobile devices.

9. A non-transitory computer-readable medium storing instructions, the instructions comprising:
one or more instructions that, when executed by one or more processors, cause the one or more processors to:
receive goal information associated with one or more performance goals associated with a radio access network (RAN);
receive performance information for mobile devices associated with the RAN;
determine, based on the goal information and the performance information, that at least one performance goal, of the one or more performance goals, is not being achieved or is predicted not to be achieved within the RAN;
generate a small cell plan for improving performance within the RAN toward achievement of the one or more performance goals,
the small cell plan to identify a set of locations at which a set of small cells are to be activated, deactivated, or deployed or a set of times at which the set of small cells are to be activated, deactivated, or deployed;
store information associated with the small cell plan; and
reconfigure one or more base stations,
the one or more base stations being associated with at least one location of the set of locations, and
the one or more base stations being reconfigured to reduce overlap between a coverage area of the one or more base stations and a coverage area of the set of small cells.

10. The non-transitory computer-readable medium of claim 9, where the performance information includes a measurement obtained by the mobile devices or by a base station of the RAN.

11. The non-transitory computer-readable medium of claim 9, where the at least one performance goal identifies a threshold quantity of handovers associated with a particular area,
the at least one performance goal not being achieved based on the performance information identifying a quantity of handovers that is greater than the threshold quantity of handovers; and
where the one or more instructions, that cause the one or more processors to provide the information associated with the small cell plan, cause the one or more processors to:
activate a small cell of the set of small cells,
the small cell being associated with the particular area.

12. A device, comprising:
one or more processors configured to:
receive information associated with one or more performance goals to be achieved within a radio access network (RAN);
receive performance information for mobile devices associated with the RAN;
determine that at least one performance goal, of the one or more performance goals, is not being achieved within the RAN, the determining being based on the information associated with the one or more performance goals and the performance information;

determine that one or more of the mobile devices are associated with a threshold velocity value; and generate a small cell plan for improving performance within the RAN toward achievement of the at least one performance goal based on the one or more of the mobile devices being determined to be associated with the threshold velocity value, the small cell plan identifying a set of locations at which a set of small cells are to be activated, deactivated, or deployed; and output information associated with the small cell plan.

13. The device of claim 12, where the small cell plan identifies a particular time period, the set of small cells to be active during the particular time period, and the set of small cells to be inactive otherwise.

14. The device of claim 12, where the one or more processors are configured to:

obtain additional information from the mobile devices based on the performance information; and where the one or more processors, when generating the small cell plan, are to:

generate the small cell plan based on the additional information.

15. The device of claim 12, where the one or more processors, when generating the small cell plan, are configured to:

perform a simulation, associated with a geographic area covered by the RAN, to identify the set of locations at which the set of small cells are to be deployed.

16. The device of claim 15, where the one or more processors are configured to:

determine first information, second information, or third information associated with the RAN, the first information relating to environmental features of the set of locations, the second information relating to one or more trends associated with the mobile devices, and the third information relating to an operator associated with the RAN; and perform the simulation based on the first information, the second information, or the third information.

17. The device of claim 12, where the at least one performance goal is associated with coverage of a first network standard; and where the one or more processors, when determining that the at least one performance goal is not being achieved, are configured to:

determine that the coverage of the first network standard does not satisfy a threshold in the set of locations or for a particular time period based on handover of the mobile devices from the first network standard to a second network standard.

18. The device of claim 12, where the small cell plan indicates to deactivate the set of small cells.

19. The device of claim 12, where the performance information includes a measurement obtained by the mobile devices or by a base station of the RAN.

20. The non-transitory computer-readable medium of claim 9, where the one or more instructions, when executed by the one or more processors, cause the one or more processors to:

perform a simulation, associated with a geographic area covered by the RAN, to identify the set of locations at which the set of small cells are to be activated, deactivated, or deployed.

* * * * *